(12) United States Patent
De Heij et al.

(10) Patent No.: US 8,640,609 B2
(45) Date of Patent: Feb. 4, 2014

(54) DEVICE FOR PASTEURIZING A MASS OF FOODSTUFF

(75) Inventors: Wouter Bernardus Cornelius De Heij, Lelystad (NL); Henricus Johannes Schuten, Arnhem (NL); Dirk Cornelis Esveld, Wageningen (NL); Henderika Maria Vollebregt, Doorwerth (NL); Herbert Laurentius Maria Sonder, Borne (NL)

(73) Assignee: Zwanenberg Food Group B.V., Almelo (NL)

( * ) Notice: Subject to any disclaimer, the term of this patent is extended or adjusted under 35 U.S.C. 154(b) by 717 days.

(21) Appl. No.: 12/293,754

(22) PCT Filed: Mar. 17, 2007

(86) PCT No.: PCT/NL2007/050109
§ 371 (c)(1),
(2), (4) Date: Dec. 21, 2009

(87) PCT Pub. No.: WO2007/108680
PCT Pub. Date: Sep. 27, 2007

(65) Prior Publication Data
US 2010/0089250 A1   Apr. 15, 2010

(30) Foreign Application Priority Data

Mar. 21, 2006 (NL) .................................. 2000034
Apr. 12, 2006 (NL) .................................. 1031578
Jan. 21, 2007 (NL) .................................. 2000448

(51) Int. Cl.
*A23L 3/00* (2006.01)
*A23L 3/01* (2006.01)

(52) U.S. Cl.
USPC ......................................................... 99/451

(58) Field of Classification Search
USPC ............. 99/451, 452, 453; 134/201; 219/696, 219/697; 225/10; 24/607, 634, 613
See application file for complete search history.

(56) References Cited

U.S. PATENT DOCUMENTS 535,267 A * 3/1895 Wagner et al. ............. 204/275.1
2,415,025 A * 1/1947 Grell et al. .................... 219/770
(Continued)

FOREIGN PATENT DOCUMENTS

EP          0497099 A1   8/1992
GB           891175 A    3/1962
(Continued)

OTHER PUBLICATIONS

Webpage download, UCDS: Faraday Cages and Microwaves, 2006, physics.ucsd.edu/~tmurphy/phys8/lectures/14_microwave.ppt, 22 pages.*

(Continued)

*Primary Examiner* — Gene Kim
*Assistant Examiner* — M Chambers
(74) *Attorney, Agent, or Firm* — The Webb Law Firm

(57) ABSTRACT

A device for pasteurizing a mass of foodstuff comprises: a feed; at least one first tube, connecting to the feed, of an electrically and magnetically inert material suitable for contact with food; two plate-like electrodes which are situated on either side of the first tube and which are connected to an RF power generator, whereby the mass present in the first tube is heated dielectrically in this first tube; a first jacket filled with a heatable first liquid and extending around the first tube; and heating means which connect to the first tube and in which the hot mass is held at practically constant temperature; at the end of which heating means the hot mass is discharged for further processing, such as cooling, portioning and packaging.

29 Claims, 2 Drawing Sheets

(56) References Cited

U.S. PATENT DOCUMENTS

Figure 1:
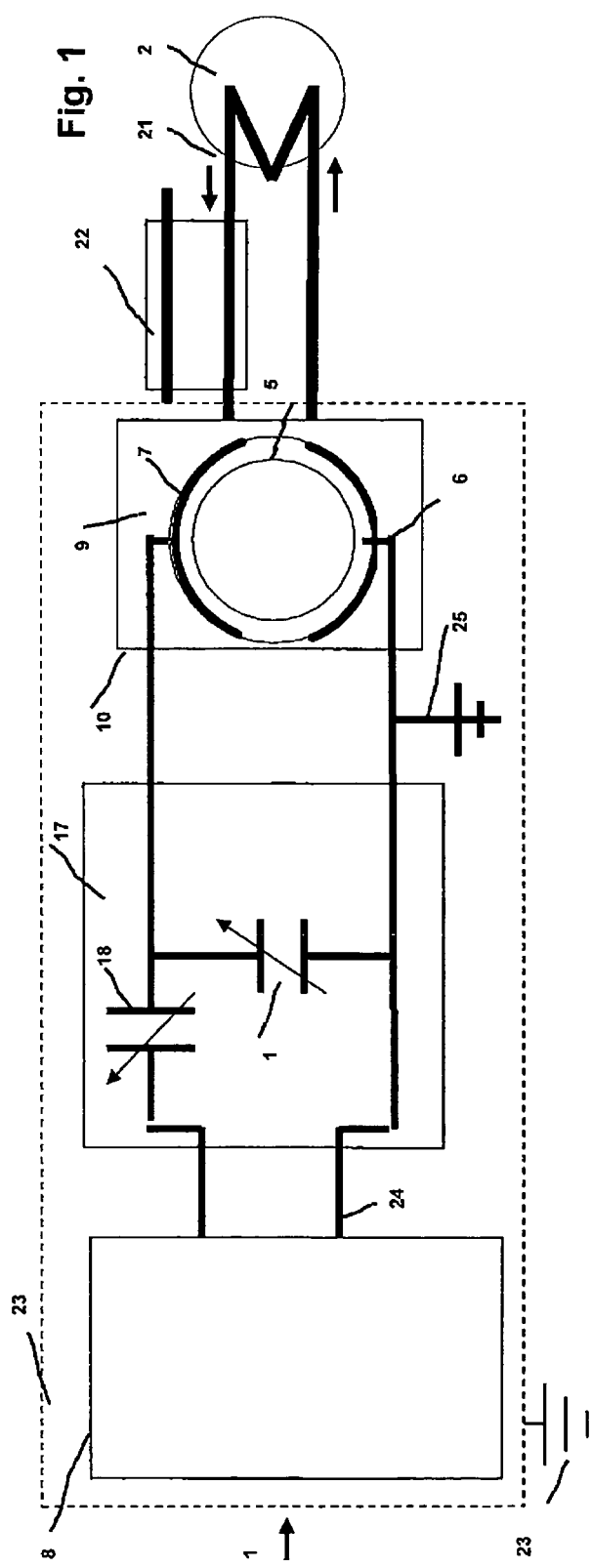

| | | | | |
|---|---|---|---|---|
| 2,564,579 | A | * | 8/1951 | Parmenter et al. ............ 219/778 |
| 3,291,671 | A | * | 12/1966 | Hecht ......................... 156/274.4 |
| 3,315,681 | A | * | 4/1967 | Poppendiek ................... 607/106 |
| 3,474,212 | A | * | 10/1969 | White .......................... 219/696 |
| 3,478,188 | A | * | 11/1969 | White .......................... 219/696 |
| 3,555,232 | A | * | 1/1971 | Bleackley .................... 219/693 |
| 3,889,013 | A | * | 6/1975 | Moule .......................... 426/513 |
| 4,431,164 | A | * | 2/1984 | Jungo et al. .................... 264/13 |
| 4,434,357 | A | * | 2/1984 | Simpson et al. ............. 392/320 |
| 4,457,221 | A | * | 7/1984 | Geren ........................... 99/451 |
| 4,919,951 | A | | 4/1990 | Jensen et al. |
| 4,971,819 | A | * | 11/1990 | Miyahara ...................... 426/244 |
| 5,288,471 | A | | 2/1994 | Corner |
| 5,630,360 | A | | 5/1997 | Polny, Jr. |
| 5,667,828 | A | | 9/1997 | Nikdel et al. ................. 426/231 |
| 5,846,583 | A | * | 12/1998 | Gentner ........................ 426/231 |
| 6,146,674 | A | * | 11/2000 | Manna et al. ................. 426/238 |
| 6,406,727 | B1 | * | 6/2002 | Hamid-Samimi et al. .... 426/241 |
| 6,989,170 | B2 | | 1/2006 | Konanayakam et al. |
| 2003/0198570 | A1 | * | 10/2003 | Asahara et al. ................. 422/22 |
| 2004/0007000 | A1 | * | 1/2004 | Takeda et al. ..................... 62/78 |
| 2006/0093717 | A1 | * | 5/2006 | Akkerman et al. ........... 426/520 |
| 2006/0151533 | A1 | * | 7/2006 | Simunovic et al. ........... 222/150 |

FOREIGN PATENT DOCUMENTS

| | | |
|---|---|---|
| GB | 891175 B1 | 3/1962 |
| JP | 1-501519 A | 6/1989 |
| JP | 2006-067943 A | 3/2006 |
| WO | 8802222 A | 4/1988 |
| WO | 8802222 A1 | 4/1988 |
| WO | 2004039164 A2 | 5/2004 |

OTHER PUBLICATIONS

Da-Wen Sun,Thermal Food Processing: New Technologies and Quality Issues, CRC Press, 2006, Chapter 15, 25 pages.*

Houben et al., "Radio-Frequency Pasteurization of Sausage Emulsions as a Continuous Process", Journal of Microwave Power and Electromagnetic Energy, vol. 26, No. 4, (1991), pp. 202-205.

* cited by examiner

DEVICE FOR PASTEURIZING A MASS OF FOODSTUFF

The invention relates to pasteurizing of a mass of foodstuff. Such a mass can for instance contain soya, fruits, potatoes, and/or meat. The mass can also contain other ingredients, such as sugar, salt, spices and the like.

The invention provides a device for pasteurizing a mass of foodstuff, such as a mass containing soya ingredients, a mass containing eggs, a mass containing fruits, for instance jam, a mass containing potatoes, or a mass containing meat, or the like, which device comprises:

a feed through which said mass can be supplied under pressure to the device at a determined flow rate;

first heating means, comprising:

a first tube, connecting to the feed, of an electrically and magnetically inert material suitable for contact with food;

two plate-like electrodes which are situated on either side and/or outside of the first tube and which are connected to an RF power generator which generates energy at a frequency in the range of about 10-50 MHz to the electrodes such that the mass present in the first tube is heated dielectrically during its first residence time in this first tube;

a first jacket filled with a heatable first liquid and extending around the first tube; and second heating means which connect to the first tube and in which the hot mass is held at practically constant temperature during its second residence time in this second tube;

at the end of which second heating means the hot mass is discharged for further processing, such as cooling, portioning and packaging.

It is important that the first jacket is filled with a first liquid. Due to the heating the first liquid already imparts a certain temperature increase to the passing mass, although of greater importance is that the liquid must be of a type such that electrical breakdown, via the mass of foodstuff, of the voltage between the electrodes is effectively prevented by this liquid. In anticipation of the discussion below, it is now already noted here that a very suitable liquid is demineralized water.

More than one first tubes can also be used, for instance two, three or even four. The mass for pasteurizing passes through each of these sub-tubes. Each of the sub-tubes is provided with its own electrodes, its own RF power generator and optionally its own impedance matching circuit. Through the use of a plurality of tubes and the associated plurality of generators a greater quantity of mass per unit of time can be heated to the desired temperature. Power generators of this type are only available commercially up to a limited power, i.e. in the order of 70-90 kW. The use of only one generator would limit the flow rate for treating, and thereby the production capacity of the device, to values corresponding therewith. The use of a plurality of generators makes it possible to increase the maximum achievable capacity by two, three or four times, or to even higher values.

It must be noted that the sub-tubes which together form the first tube can in principle be connected to each other in series or in parallel as desired by the designer or the user. The required effect of increased capacity is realized in all cases. In the case of parallel tubes the heating of the mass takes place in each sub-tube from the starting temperature to the desired end temperature, while in the case of tubes connected to each other in series the temperature increase takes place in more or less stepwise manner, for instance in the case of two tubes mutually connected in series from about 10-40° C. in the first sub-tube and from about 40-70° C. in the second sub-tube.

Parallel tubes have the advantage of a lower flow resistance, whereby the feed device is required to produce a lower infeed pressure. The drawback is that, while the tubes occupy a relatively small space in longitudinal direction, they necessarily entail larger dimensions in transverse direction.

The pasteurizing processing which is performed by the device according to the invention can also serve for allowing the treated mass to cure by the heating occurring for some time. A mixture of meat ingredients, salt, spices and binding agents can thus be formed in one continuous treatment with the device according to the invention into a continuous sausage which is then portioned under sterile conditions, packaged and if necessary further confectioned, whereafter transport to the customers can take place.

The invention can be embodied such that the first liquid consists for a substantial part of water.

An embodiment is recommended in which the first liquid is water, preferably demineralized water.

The second heating means can in principle be implemented in any desired manner. It will be apparent that the mass heated in the first tube by these electrical means must be prevented from undergoing a certain drying or other degeneration during its residence in the second heating means. A longer stay in air will generally result in undesirable effects, such as drying and possibly even oxidation. In order to effectively preclude these undesired phenomena, a variant can have the special feature that the second heating means comprise a second tube.

A heating element of a suitable type must be added to this second tube.

Very suitable is an embodiment comprising a second jacket filled with a heatable second liquid and extending around the second tube.

For further processing of the mass thus pasteurised in the device, it will in many cases have to be given the opportunity to cool before being portioned and packed. If desired, this cooling can take place after portioning and packing.

An embodiment is often recommended comprising cooling means which connect to the second heating means and in which the hot mass is given the opportunity to cool during its third residence time in these cooling means, at the end of which cooling means the thus cooled mass is discharged for further processing.

Described above is that the second heating means preferably comprise a second tube. For the same reasons as stated above, the above described embodiment preferably has the feature that the cooling means comprise a third tube connecting to the second tube.

Such a third tube can be wound in the form of a helix, thereby obtaining a great length in a relatively small space, whereby, optionally in combination with an external cooling medium, for instance flow-by air, a rapid cooling is obtained. Other than in the dielectric heating in the first tube, in this cooling section the heat is removed from the pasteurized mass solely by conduction. Necessary for this purpose is time, and therefore a relatively great length.

Use can also be made in per se known manner of a portioning process, optionally followed by a packing process, wherein the portions are guided through a cooling space by means of trolleys. A per se known lift-tower is suitable in this respect.

Attention is drawn to the fact that the inner diameter of the tubes does not have to be round. Any desired and technically realizable form can be chosen.

A device is known from WO-A-88/02222 for cooking and thus curing a meat-containing mass. For heating of the mass carried through the device under pressure use is made of a field, described as an electromagnetic field, with a frequency between 10 and 41 MHz, such that the mass is exposed to an efficient heating.

The medium is carried through the device by a pipe, leaves the device in hot state and in this state is cut into pieces or slices and, if desired, packed immediately thereafter.

WO-A-2004/039164 relates to a method and system for manufacturing a sausage product without casing. According to this known art the mass is heated by a first heating element based on heat conduction, then heated to an increased temperature by a second heating element, whereby a sausage without casing is obtained, whereafter the product is finally cooled in forced manner through the action of a cooler.

This specification mentions the possible application of microwave energy or radiofrequency or RF energy. The frequency ranges in question are not further defined in this publication. Since microwaves have by definition a frequency of more than 300 MHz, it is not possible as a result of the associated wavelengths to prevent hot and cold zones occurring in the mass to be heated. In respect of the wish for fully homogeneous heating this is highly undesirable, and even impermissible in respect of requirements set down for food products. The temperature to be reached is after all chosen with a view to a pasteurizing treatment, which requires a minimum temperature of 72° C. everywhere in the heated mass, which temperature must be maintained for a time period in the order of at least 2 minutes. In this respect frequencies over 300 MHz are certainly not suitable according to the invention. This is the reason that an RF frequency in said range of about 10-50 MHz has been chosen according to the invention.

Compared to the two stated prior art references, it is deemed essential according to the invention that use is made of a liquid-filled jacket, thereby effectively preventing breakdown of the high RF voltage between the electrodes. According to the above cited prior art such a breakdown cannot be prevented and it is found in practice that local burning or other degeneration of the passing mass occurs as a consequence of this breakdown. This is an extremely undesirable phenomenon which in most cases causes a lack of control and degeneration which is completely unacceptable for food products.

Each of the tubes preferably has the same cross-sectional shape everywhere.

A material which is completely transparent for said frequencies is a plastic, for instance PTFE (polytetrafluoroethylene). This material has the further advantage of being very suitable for contact with food. It is a smooth material to which food products do not adhere, or hardly so. The material can further be very easily given a smooth finish, and thus be cleaned regularly in accordance with set requirements.

The electrodes can be of any suitable material. Aluminium plates can for instance be applied.

The device has an in-line arrangement and is able to perform a continuous and very homogeneous heating, wherein it can be ensured that the temperature difference between the hottest and the coldest zones in the heated mass is less than 5° C.

The system is capable of a rapid heating into the core of the mass, for instance at a speed in the order of magnitude of 1° C./s.

The temperature of the supplied mass can be assumed to be about 0° C.-10° C. The target temperature is reached at the end of the electrodes.

According to a determined aspect of the invention, the device has the special feature that the material of the second tube is stainless steel.

The device can also have the special feature that the material of the third tube is stainless steel.

Very practical is the embodiment in which the second and the third tube are embodied together as an integral tube.

According to a subsequent aspect according to the invention, the device has the special feature that the first residence time and the RMS RF voltage over the electrodes can be adjusted such that the temperature of the mass at the end of the first tube has a value in the range of about 70° C.-100° C.

The setting of said parameters for reaching said temperature depends inter alia on the salt content of the mass. The choice of the parameters must therefore also be made in the light thereof.

According to a following aspect of the invention, the device has the special feature that the average effective internal diameter of the first tube is in the range of about 20-150 mm. A value of 50-115 mm is particularly envisaged here.

Another aspect of the dimensioning of the device can lie in the length of the electrodes being in the range of about 0.3-3 m. The electrodes preferably have a length in the order of 0.5-1.5 m.

The greatest efficiency of the RF heating is realized with an embodiment in which the electrodes each have a form corresponding with the external shape of the tube.

A constant speed at a given mass flow rate and a total absence of discontinuities is realized with an embodiment in which the internal cross-sectional forms of mutually connecting tubes are the same as each other and correspond with the desired cross-sectional form of the end product.

Diverse liquids can be considered for filling the jackets. An embodiment is recommended in which the second liquid is water, preferably demineralized water, or an oil, preferably a thermal oil.

For the safety of operating staff and others present, the embodiment is recommended in which all RF voltage-carrying components are accommodated in a housing, in particular a Faraday cage. The mesh of the Faraday cage can be relatively coarse in respect of the relatively large wavelength, relative to microwave radiation, associated with the frequencies applied according to the invention.

In order to maximize the efficiency of heating of the mass for cooking and pasteurizing, the embodiment is recommended in which the liquid in the first jacket is held at a temperature in the range of about 20° C.-100° C.

During a residence time of a minimum of two minutes in the section in which the mass is kept warm, for instance the second tube, the temperature everywhere in the mass for pasteurizing may not fall below a determined prescribed temperature, usually in the order of magnitude of 72° C.-75° C.

In a specific embodiment the device can for this purpose have the special feature that the liquid in the second jacket is held at a temperature in the range of about 70° C.-100° C.

A preferred aspect according to the invention lies in the fact that the electrodes are coupled to the associated RF generator via an adjustable impedance matching circuit.

The device can for instance have the feature that the feed is adapted for coupling to a preproduction device, for instance a meat pump. For this purpose the inlet side of the first tube can be provided with a flange, which is adapted for sealing coupling to a correspondingly formed outlet flange of a known meat pump.

The device can have the particular feature that the frequency lies in the range of 12-29 MHz.

According to yet another aspect of the invention, the device has the special feature that the frequency has a value of 27±2 MHz. The frequency 27.12 MHz is for instance a frequency allowed for industrial applications such as the present ones.

According to yet another aspect of the invention, the device has the special feature that the frequency has a value of 13.5±1 MHz. The frequency 13.56 MHz is likewise allowed for industrial applications such as the present ones.

It is noted that the third tube subjects the cooked and pasteurized mass to a gradual cooling by conduction on the inside and convection on the outside. The third tube will therefore generally have to have a relatively great length compared to the first and the second tube.

In a specific embodiment the device has the special feature that the first and the second jacket are embodied together as one integral jacket. It is recommended in this case to fill the jackets with heated demineralized water.

It is further noted generally that the jackets through which heated liquid flows have the function of a primary circuit of a heat exchange, the associated tube or tubes of which form the secondary circuit. Heat exchange thus takes place between the heated liquid and the mass for processing transported through the tubes. As generally known, a heat exchanger of this co-axial type has the highest efficiency in the case of backflow. With a view hereto the feed of the heated liquid will in this respect preferably be situated on the downstream side of the transported mass, while the discharge of this heated liquid, already slightly cooled in the heat exchanger, will be situated on the upstream side thereof.

According to a final aspect of the invention, the device has the special feature that downstream of the second tube a treatment section is present in which the hot mass is subjected to an after-treatment, such as smoking, adding of seasoning, grilling or the like.

Figure 2:
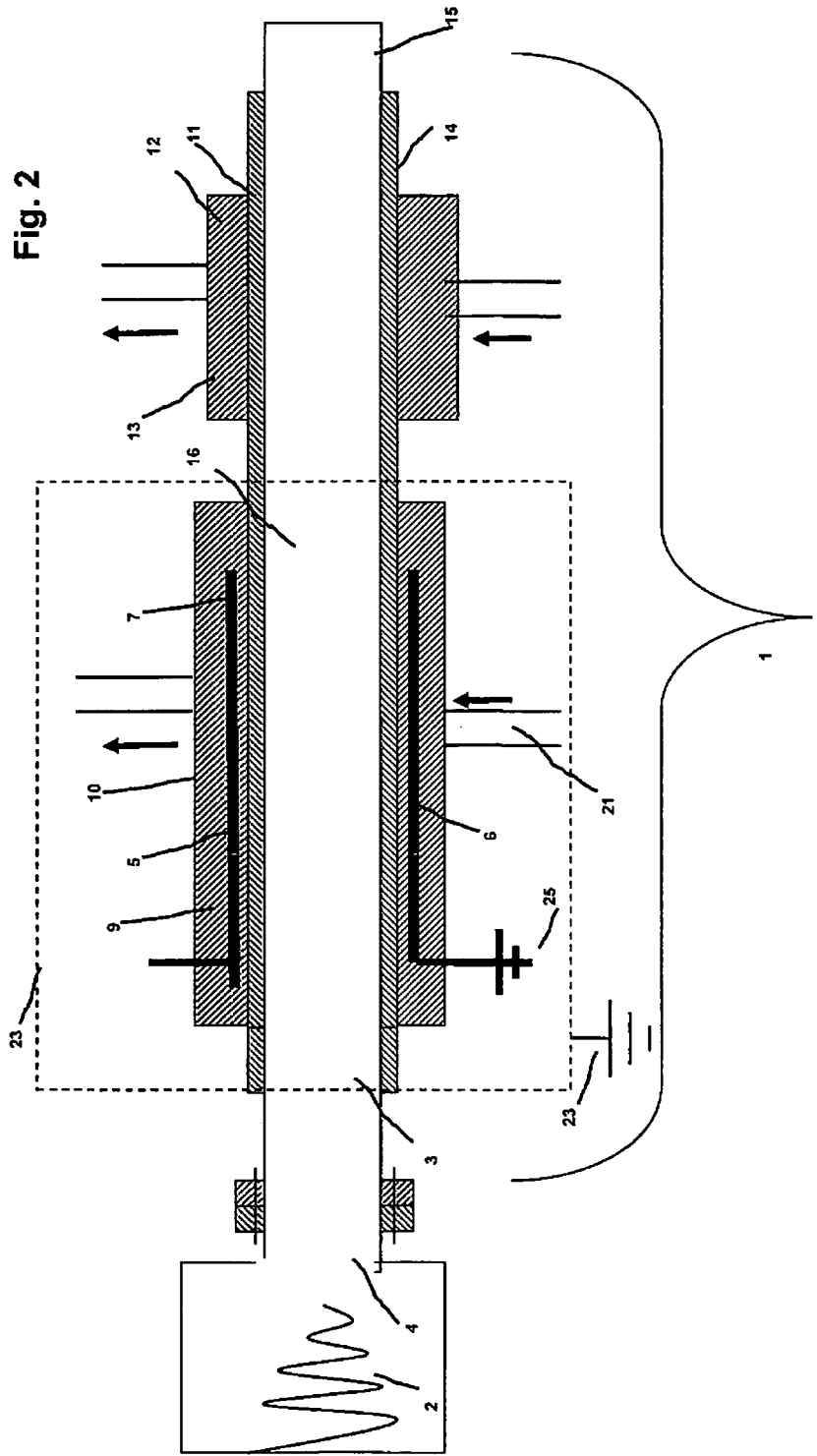

The invention will now be elucidated with reference to the accompanying drawings. In the drawings:

FIG. 1 shows a highly simplified representation of an exemplary embodiment of the device according to the invention, partially in the form of a block diagram and partially in cross-section; and FIG. 2 shows a longitudinal section through the device according to FIG. 1.

The figures show a device 1 for cooking and pasteurizing a meat-containing mass 4, which mass 4 is supplied to device 1 by a meat pump 2 of known type. The device comprises a feed 3 through which a mass 4 is supplied under pressure to device 1 at a determined flow rate; a first tube 5, connecting to feed 3, of an electrically and magnetically inert material suitable for contact with food, in particular PTFE; two plate-like electrodes 6, 7 situated on either side and/or outside of first tube 5 and having a form corresponding to the external shape of first tube 5, which electrodes are connected to an RF power generator 8 which generates energy with a frequency in the range of about 27.12 MHz to electrodes 6, 7 such that mass 4 present in first tube 5 is heated dielectrically during its first residence time in this first tube 5; a first jacket 10 extending around first tube 5 and filled with demineralized water 9; a second tube 11 which connects to first tube 5 and in which the mass heated in first tube 5 is held at practically constant temperature during its second residence time of a minimum of two minutes in the second tube; a second jacket 13 extending around second tube 11 and filled with thermal oil 12; and a relatively long third tube 14 which connects to second tube 11 and in which the hot mass is given the opportunity to cool during its third residence time in this third tube, at the end 15 of which third tube 14 the thus cooled mass is discharged for further processing, for instance portioning and/or packing.

Second tube 11 and third tube 14 are embodied together as one integral, monolithic tube of stainless steel.

The first residence time and the RMS RF voltage over the electrodes can be adjusted such that the temperature of mass 4 has a value in the range of about 70° C.-90° C. at the end 16 of first tube 5. For an energy transfer, and thus heating of mass 4, with the highest possible efficiency the electrodes 6, 7 are coupled to RF generator 8 via an impedance matching circuit 17. Circuit 17 comprises a variable capacitor 8 connected in series and a variable second capacitor 19 connected in parallel to electrodes 6, 7.

The RF generator 8 can be adapted to generate energy with a frequency of for instance 27.12 MHz or 13.56 MHz. These are both legally permissible frequencies for industrial applications of this type.

The first liquid is held at a desired temperature of for instance 40° C. by means of a heating device 20 having a heat exchanger with a pump. In this embodiment a demineralizing unit 22 is also incorporated in supply conduit 21. In this case use is made of water. Other liquids such as thermal oil are also suitable.

The second liquid 12 can be brought to and held at the desired temperature in similar manner.

With a view to the requirements set down for pasteurization, the residence time of the hot mass in second tube 11 must be a minimum of two minutes.

The RF voltage-carrying components are all accommodated in a Faraday cage 23. This Faraday cage is earthed via an earth wire 23. Electrode 6 is also earthed, via an earth wire 25, with which the electrode is also coupled to the RF generator. This is therefore also earthed. Both the Faraday cage and said earthings are essential for the safety of operating staff.

It will be apparent that, also in the light of legal provisions, the device will comprise further safety provisions which for instance ensure that, when the device is opened or the earthing of the Faraday cage is interrupted, the RF voltage of the electrodes is immediately switched off, for instance by immediately switching off the RF power generator or generators.

It will be apparent that the invention is not limited to the described exemplary embodiment. As already described, the first tube can thus comprise a number of sections which can be connected in parallel or in series as desired, or a combination thereof, for instance two parallel sub-tubes each consisting of two sub-segments connected in series.

The use of tubes has the drawback, compared to open transport on for instance a conveyor belt, of a relatively high flow resistance, wherein it must be noted that for instance water or fat present in the treated mass has a lubricating and sliding effect relative to the inner surface of a heated tube. In the case of cooling use can for instance be made of an atmosphere with a high humidity or a protective atmosphere, for instance nitrogen, in which the mass is in principle transported in pressureless manner.

It is generally recommended to allow the pressure in the mass to be no higher than about 4 bar.

The invention claimed is:

1. A device for pasteurizing a mass of foodstuff, which device comprises:
    a feed through which said mass can be supplied under pressure to the device at a determined flow rate;
    first heating means, comprising:
        a first tube, connecting to the feed, of an electrically and magnetically inert material suitable for contact with foods; and
        two plate-like electrodes which are situated outside of the first tube and which are connected to an RF power generator which generates energy at a frequency in the range of about 10-50 MHz to the electrodes such that the mass present in the first tube is heated dielectrically during a first residence time in this first tube;

a first jacket filled with a heatable first liquid and extending around the first tube and the electrodes wherein said electrodes are immersed in said first liquid and each electrode has a form corresponding with the external shape of said tube; and a second heating means which connects to the first tube and in which the hot mass is held at practically constant temperature during a second residence time in this second tube;

at the end of which second heating means the hot mass is discharged for further processing.

2. The device as claimed in claim 1, wherein the second heating means comprise a second tube.

3. The device as claimed in claim 2, comprising a second jacket filled with a heatable second liquid and extending around the second tube.

4. The device as claimed in claim 3, wherein the first and the second jacket are embodied together as one integral jacket.

5. The device as claimed in claim 3, wherein the second liquid is water or an oil.

6. The device as claimed in claim 3, wherein the liquid in the second jacket is held at a temperature in a range of about 70° C.-100° C.

7. The device as claimed in claim 2, wherein downstream of the second tube a treatment section is present in which the hot mass is subjected to an after-treatment.

8. The device as claimed in claim 2, comprising a cooling means which connects to the second tube in which the hot mass is given the opportunity to cool during a third residence time in the cooling means, at the end of which cooling means the thus cooled mass is discharged wherein the cooling means comprise a third tube.

9. The device as claimed in claim 8, wherein the material of the second tube and/or the third tube is stainless steel.

10. The device as claimed in claim 2, wherein the second and the third tube as embodied together as one integral tube.

11. The device as claimed in claim 1, wherein the first tube comprises at least two sub-tubes, to each of which sub-tubes are added two plate-like electrodes, an RF power generator.

12. The device as claimed in claim 11, wherein to each of the sub-tubes is added an impedance matching circuit.

13. The device as claimed in claim 1, wherein the first liquid consists for a substantial part of water.

14. The device as claimed in claim 13, wherein the first liquid is water.

15. The device as claimed in claim 1, comprising a cooling means which connects to the second heating means and in which the hot mass is given the opportunity to cool during a third residence time in the cooling means, at the end of which cooling means the thus cooled mass is discharged for further processing.

16. The device as claimed in claim 1, wherein the material of the first tube is a plastic.

17. The device as claimed in claim 1, wherein the material of the first tube if PTFE.

18. The device as claimed in claim 1, wherein the first residence time and an RMS RF voltage over the electrodes can be adjusted such that the temperature of the mass at the end of the first tube has a value in the range of about 70° C.-100° C.

19. The device as claimed in claim 1, wherein an average effective internal diameter of the first tube is in a range of about 20-150 mm.

20. The device as claimed in claim 1, wherein a length of the electrodes lies in a range of about 0.3-3 m.

21. The device as claimed in claim 1, wherein internal cross-sectional forms of mutually connecting tubes are the same as each other and correspond with a desired cross-sectional form of an end product.

22. The device as claimed in claim 1, wherein all RF voltage-carrying components are accommodated in a housing, in particular a Faraday cage.

23. The device as claimed in claim 1, wherein the liquid in the first jacket is held at a temperature in a range of about 20° C.-100° C.

24. The device as claimed in claim 1, wherein the electrodes are coupled to the associated RF generator via an adjustable impedance matching circuit.

25. The device as claimed in claim 1, wherein the feed is adapted for coupling to a preproduction device.

26. The device as claimed in claim 1, wherein the frequency lies in a range of 12-29 MHz.

27. The device as claimed in claim 1, wherein the frequency has a value of 27±2 MHz.

28. The device as claimed in claim 1, wherein the frequency has a value of 13.5±1 MHz.

29. The device as claimed in claim 1, wherein the electrodes are situated on either side of the first tube.

* * * * *

UNITED STATES PATENT AND TRADEMARK OFFICE
CERTIFICATE OF CORRECTION

PATENT NO.        : 8,640,609 B2
APPLICATION NO. : 12/293754
DATED             : February 4, 2014
INVENTOR(S)       : De Heij et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1298 days.

Signed and Sealed this
Twenty-second Day of September, 2015

Michelle K. Lee
*Director of the United States Patent and Trademark Office*